(12) United States Patent
Borch (10) Patent No.: US 12,554,314 B2
(45) Date of Patent: Feb. 17, 2026

(54) MULTI-NODE COMPUTING SYSTEM

(71) Applicant: Samsung Electronics Co., Ltd., Suwon-si (KR)

(72) Inventor: Eric Richard Borch, Fort Collins, CO (US)

(73) Assignee: Samsung Electronics Co., Ltd., Yongin-si (KR)

( * ) Notice: Subject to any disclaimer, the term of this patent is extended or adjusted under 35 U.S.C. 154(b) by 99 days.

(21) Appl. No.: 18/472,169

(22) Filed: Sep. 21, 2023

(65) Prior Publication Data

US 2024/0310897 A1 Sep. 19, 2024

Related U.S. Application Data

(60) Provisional application No. 63/452,110, filed on Mar. 14, 2023, provisional application No. 63/452,089, filed on Mar. 14, 2023.

(51) Int. Cl.
*G06F 1/32* (2019.01)
*G06F 1/3287* (2019.01)

(52) U.S. Cl.
CPC .................................. *G06F 1/3287* (2013.01)

(58) Field of Classification Search
CPC ...................................................... G06F 1/3287
See application file for complete search history.

(56) References Cited

U.S. PATENT DOCUMENTS

| 5,613,070 | A | * | 3/1997 | Born | H04L 12/44 |
| | | | | | 709/253 |
| 8,107,458 | B1 | | 1/2012 | Ranganathan et al. | |
| 8,341,441 | B2 | | 12/2012 | Fletcher | |
| 9,225,545 | B2 | | 12/2015 | Archer et al. | |
| 9,454,209 | B2 | | 9/2016 | Mukherjee et al. | |
| 10,394,738 | B2 | | 8/2019 | Flajslik et al. | |
| 10,659,254 | B2 | | 5/2020 | Sindhu et al. | |
| 10,742,513 | B2 | | 8/2020 | Wong | |
| 11,165,686 | B2 | | 11/2021 | Heidelberger et al. | |

(Continued)

FOREIGN PATENT DOCUMENTS

| CN | 114020443 B | 3/2022 |
| KR | 10-2123117 B1 | 6/2020 |
| WO | 2020/190314 A1 | 9/2020 |

OTHER PUBLICATIONS

Extended European Search Report for EP Application No. 24 163 533.3 dated Jul. 3, 2024, 9 pages.

(Continued)

*Primary Examiner* — Stefan Stoynov (74) *Attorney, Agent, or Firm* — Womble Bond Dickinson (US) LLP (57) ABSTRACT

A multi-node computing system. In some embodiments, the system includes: a first compute board, a second compute board, a plurality of compute elements, a plurality of memories, a first network plane connecting the first compute board and the second compute board, and a second network plane connecting the first compute board and the second compute board. The plurality of memories may store instructions that, when executed by the plurality of compute elements, cause the plurality of compute elements to: determine that a criterion for deactivating the first network plane is met, and deactivate the first network plane.

20 Claims, 6 Drawing Sheets

(56) References Cited

U.S. PATENT DOCUMENTS

| | | |
|---|---|---|
| 11,196,587 B2 | 12/2021 | Tam et al. |
| 11,677,628 B2 | 6/2023 | Bower, III et al. |
| 2009/0040946 A1 | 2/2009 | Archer et al. |
| 2013/0010639 A1 | 1/2013 | Armstrong et al. |
| 2013/0097448 A1 | 4/2013 | Davis et al. |
| 2013/0268714 A1 | 10/2013 | Brundridge et al. |
| 2015/0208145 A1 | 7/2015 | Parker et al. |
| 2016/0091913 A1 | 3/2016 | Pani |
| 2017/0187579 A1 | 6/2017 | Borch et al. |
| 2019/0012278 A1 | 1/2019 | Sindhu et al. |
| 2019/0012350 A1 | 1/2019 | Sindhu et al. |
| 2019/0044827 A1* | 2/2019 | Ganapathi ............. H04L 47/125 |
| 2019/0089650 A1* | 3/2019 | Leung .................... H04L 49/15 |
| 2020/0252275 A1 | 8/2020 | Zhuo et al. |
| 2020/0322285 A1 | 10/2020 | Franza et al. |
| 2020/0322287 A1 | 10/2020 | Connor et al. |
| 2021/0117242 A1 | 4/2021 | Van de Groenendaal et al. |
| 2021/0320820 A1 | 10/2021 | Ruan et al. |
| 2021/0336901 A1 | 10/2021 | Moxnes et al. |
| 2022/0239587 A1 | 7/2022 | Roweth et al. |
| 2024/0310897 A1 | 9/2024 | Borch |

OTHER PUBLICATIONS

EPO Extended European Search report dated Aug. 29, 2024, issued in European Patent Application No. 24163220.7 (7 pages).
US Office Action dated May 19, 2025, issued in U.S. Appl. No. 18/474,178 (22 pages).
US Final Office Action dated Sep. 24, 2025, issued in U.S. Appl. No. 18/474,178 (22 pages).

* cited by examiner

MULTI-NODE COMPUTING SYSTEM

CROSS-REFERENCE TO RELATED APPLICATION(S)

The present application claims priority to and the benefit of (i) U.S. Provisional Application No. 63/452,089, filed Mar. 14, 2023, entitled "PARTITIONING SUPERNODE NETWORK", and (ii) U.S. Provisional Application No. 63/452,110, filed Mar. 14, 2023, entitled "POWERING DOWN SUPERNODE NETWORK COMPONENTS", the entire contents of both which are incorporated herein by reference.

FIELD

One or more aspects of embodiments according to the present disclosure relate to computing systems, and more particularly to a multi-node computing system.

BACKGROUND

Modern computing systems may include one or more nodes, each including processing resources, such as a central processing unit (CPU) and storage resources, such as memory or persistent storage.

It is with respect to this general technical environment that aspects of the present disclosure are related.

SUMMARY

According to an embodiment of the present disclosure, there is provided a system, including: a first compute board; a second compute board; a plurality of compute elements; a plurality of memories; a first network plane connecting the first compute board and the second compute board; and a second network plane connecting the first compute board and the second compute board, the plurality of memories storing instructions that, when executed by the plurality of compute elements, cause the plurality of compute elements to: determine that a criterion for deactivating the first network plane is met; and deactivate the first network plane.

In some embodiments, the deactivating of the first network plane includes causing the first network plane to transition to a low-power state.

In some embodiments, the instructions, when executed by the plurality of compute elements, further cause the plurality of compute elements to cease sending traffic to the first network plane, before deactivating the first network plane.

In some embodiments, the instructions, when executed by the plurality of compute elements, further cause the plurality of compute elements to wait for traffic to drain out of the first network plane, before deactivating the first network plane.

In some embodiments, the determining that the criterion for deactivating a network plane is met includes: calculating a utilization of the first network plane; and determining that the utilization of the first network plane is less than a threshold.

In some embodiments: a switch of the first network plane includes a first utilization counter, and calculating the utilization of the first network plane includes calculating the utilization of the first network plane based on a value of the first utilization counter.

In some embodiments, calculating the utilization of the first network plane includes calculating the utilization of the first network plane based on a plurality of respective values of a plurality of utilization counters including the value of the first utilization counter.

In some embodiments, the determining that the criterion for deactivating a network plane is met includes: calculating an expected utilization of the first network plane; and determining that the expected utilization of the first network plane is less than a threshold.

In some embodiments: the instructions, when executed by the plurality of compute elements, further cause the plurality of compute elements to execute an application; the executing of the application includes generating an indication of expected network plane use; and the calculating of the expected utilization of the first network plane includes calculating the expected utilization of the first network plane based on the indication of expected network plane use.

In some embodiments, the instructions, when executed by the plurality of compute elements, further cause the plurality of compute elements to: determine that the first network plane is deactivated; and in response to determining that the first network plane is deactivated, route a packet via the second network plane.

In some embodiments, the first compute board includes: a first switch; a second switch; a memory; and a compute element, the second compute board includes: a first switch; a second switch; a memory; and a compute element, the first network plane includes the first switch of the first compute board and the first switch of the second compute board; and the second network plane includes the second switch of the first compute board and the second switch of the second compute board, the plurality of compute elements includes the compute element of the first compute board and the compute element of the second compute board; and the plurality of memories includes the memory of the first compute board and the memory of the second compute board.

According to an embodiment of the present disclosure, there is provided a method, including: determining, by a plurality of compute elements, that a criterion for deactivating a first network plane is met; and deactivating the first network plane, wherein the compute elements are part of a computing system including: a first compute board; a second compute board; the plurality of compute elements; a plurality of memories; the first network plane; and a second network plane connecting the first compute board and the second compute board, and wherein the first network plane connects the first compute board and the second compute board.

In some embodiments, the deactivating of the first network plane includes causing the first network plane to transition to a low-power state.

In some embodiments, the method further includes ceasing to send traffic to the first network plane, before deactivating the first network plane.

In some embodiments, the method further includes waiting for traffic to drain out of the first network plane, before deactivating the first network plane.

In some embodiments, the determining that the criterion for deactivating a network plane is met includes: calculating a utilization of a plurality of network planes, the plurality of network planes including the first network plane and the second network plane; and determining that the utilization of the plurality of network planes is less than a threshold.

In some embodiments: a switch of the first network plane includes a first utilization counter, and calculating the utilization of the first network plane includes calculating the utilization of the first network plane based on a value of the first utilization counter.

In some embodiments, calculating the utilization of the first network plane includes calculating the utilization of the first network plane based on a plurality of respective values of a plurality of utilization counters including the value of the first utilization counter.

In some embodiments, the determining that the criterion for deactivating a network plane is met includes: calculating an expected utilization of the first network plane; and determining that the expected utilization of the first network plane is less than a threshold.

According to an embodiment of the present disclosure, there is provided a system, including: a first compute board; a second compute board; a plurality of means for processing; a plurality of memories; a first network plane connecting the first compute board and the second compute board; and a second network plane connecting the first compute board and the second compute board, the plurality of memories storing instructions that, when executed by the plurality of means for processing, cause the plurality of means for processing to: determine that a criterion for deactivating the first network plane is met; and deactivate the first network plane.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a multi-node computing system provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In a computing system, a large node may have multiple (e.g., many) processing elements or "compute elements" (or "compute circuits"), and various types of storage resources, such as one or more caches, main memory, or persistent storage. The compute elements may be connected to other compute elements by a network connection, e.g., a connection to a network which may include a plurality of switches (or "switch circuits"), connections between the switches, and connections between some of the switches and the compute elements. In operation, multiple applications may run on a single node. Such applications may, in some circumstances, compete for the same network resources, causing contention in the network. This contention may reduce the performance of applications that are utilizing the network. The performance loss may be due, for example, to increased latencies for traffic across the network or due to a reduction in bandwidth available for a single application.

Figure 1A:
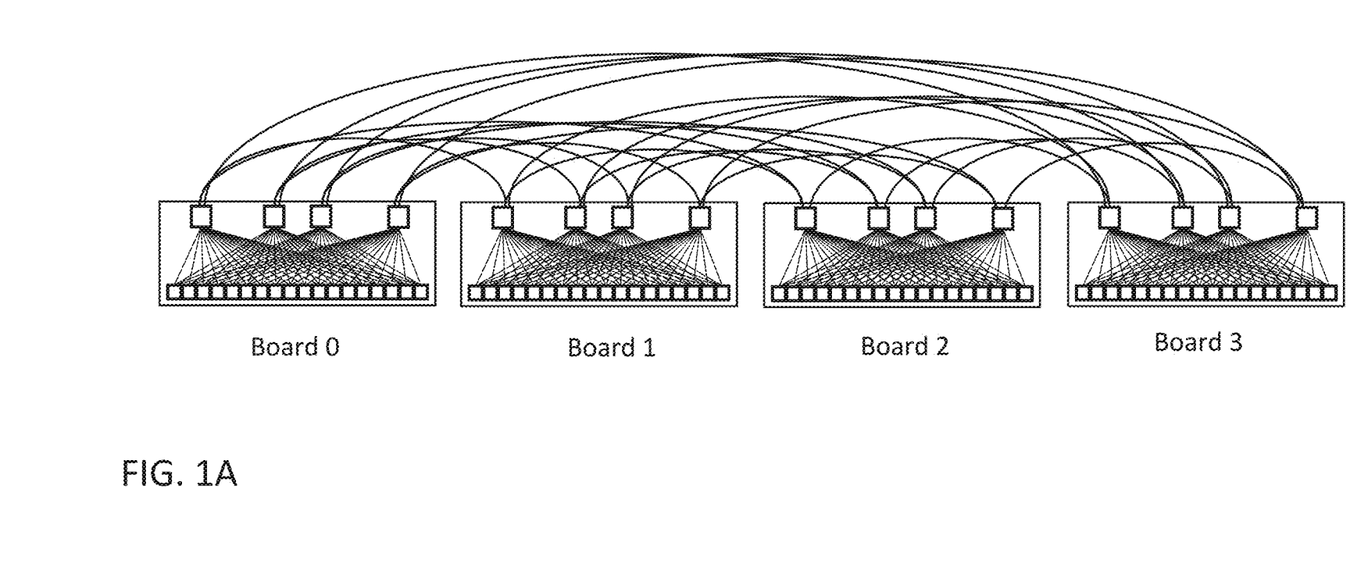
FIG. 1A is a schematic block diagram of a computing system, according to an embodiment of the present disclosure.
Figure 1B:
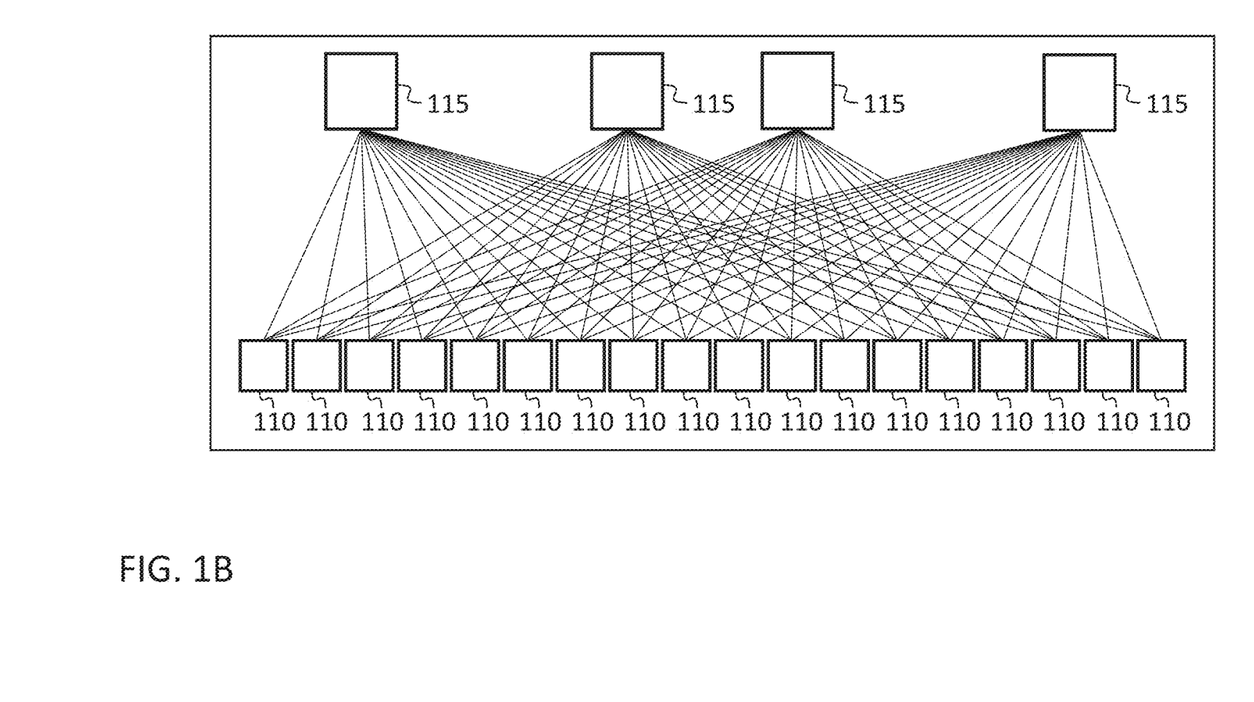
FIG. 1B is a schematic block diagram of a compute board, according to an embodiment of the present disclosure.
Figure 2:
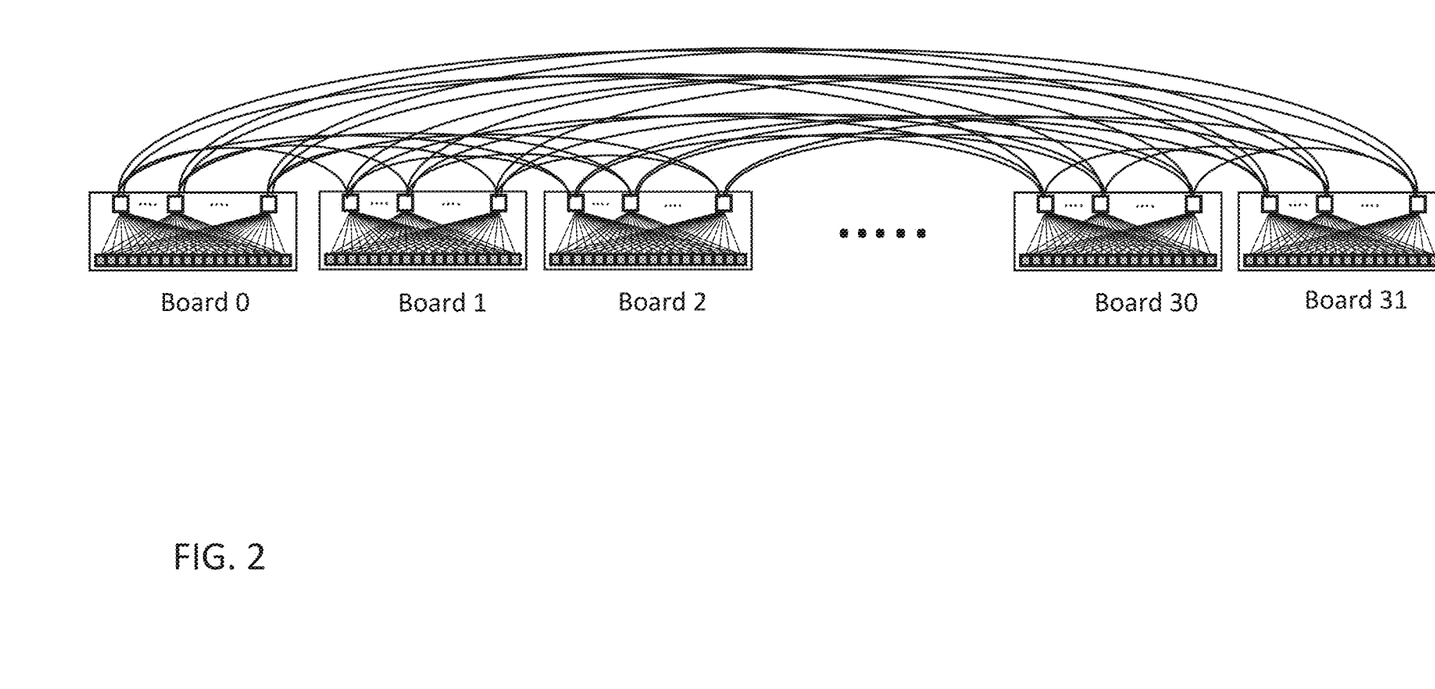
FIG. 2 is a schematic block diagram of a computing system, according to an embodiment of the present disclosure.

FIG. 1A is a schematic block diagram of a computing system including four compute boards 105, labeled Board 0, Board 1, Board 2, and Board 3. Each compute board 105 may be a printed circuit board include computing resources, storage resources, and networking resources, and the compute boards 105 may be connected together by network, as discussed in further detail below. FIG. 1B shows the structure of a compute board 105, in some embodiments. The compute board 105 includes a plurality of compute elements 110 and a plurality of switches 115. Each of the switches 115 may be connected to all of the compute elements 110 on the compute board 105, as shown. The connections between the switches 115 and the compute elements 110 may be ones that conform to any standard suitable for communications on a compute board, e.g., they may be Peripheral Component Interconnect Express (PCIe) connections, Compute Express Link (CXL) connections, Medium Reach (MR) connections, or Very Short Reach (VSR) connections, or connections conforming to another protocol (e.g., a protocol purpose-designed for such a compute board 105). FIG. 1A shows a system with four compute boards 105; other embodiments may include more or fewer compute boards 105 (e.g., 32 compute boards 105, as in the embodiment of FIG. 2). FIG. 1B shows a compute board 105 with 18 compute elements 110 and four switches 115; other embodiments may include more or fewer compute elements 110 or more or fewer switches 115. Each of the compute boards 105 may include one or more memories (or "memory circuits") (e.g., dynamic random access memories (DRAMs) or High Bandwidth Memories (HBMs)), used to store instructions for execution by the compute elements 110 and data for processing by the compute elements 110. Some or all of the memories (or some portions of the memories) may be shared by (and accessible by) all of the compute elements 110 of the computing system in the sense that any one of the compute elements 110 may be able to read from any shared memory location (including shared memory locations on other compute boards 105) using a load instruction, and any one of the compute elements 110 may be able to write to any shared memory location (including shared memory locations on other compute boards 105) using a store instruction.

Figure 1C:
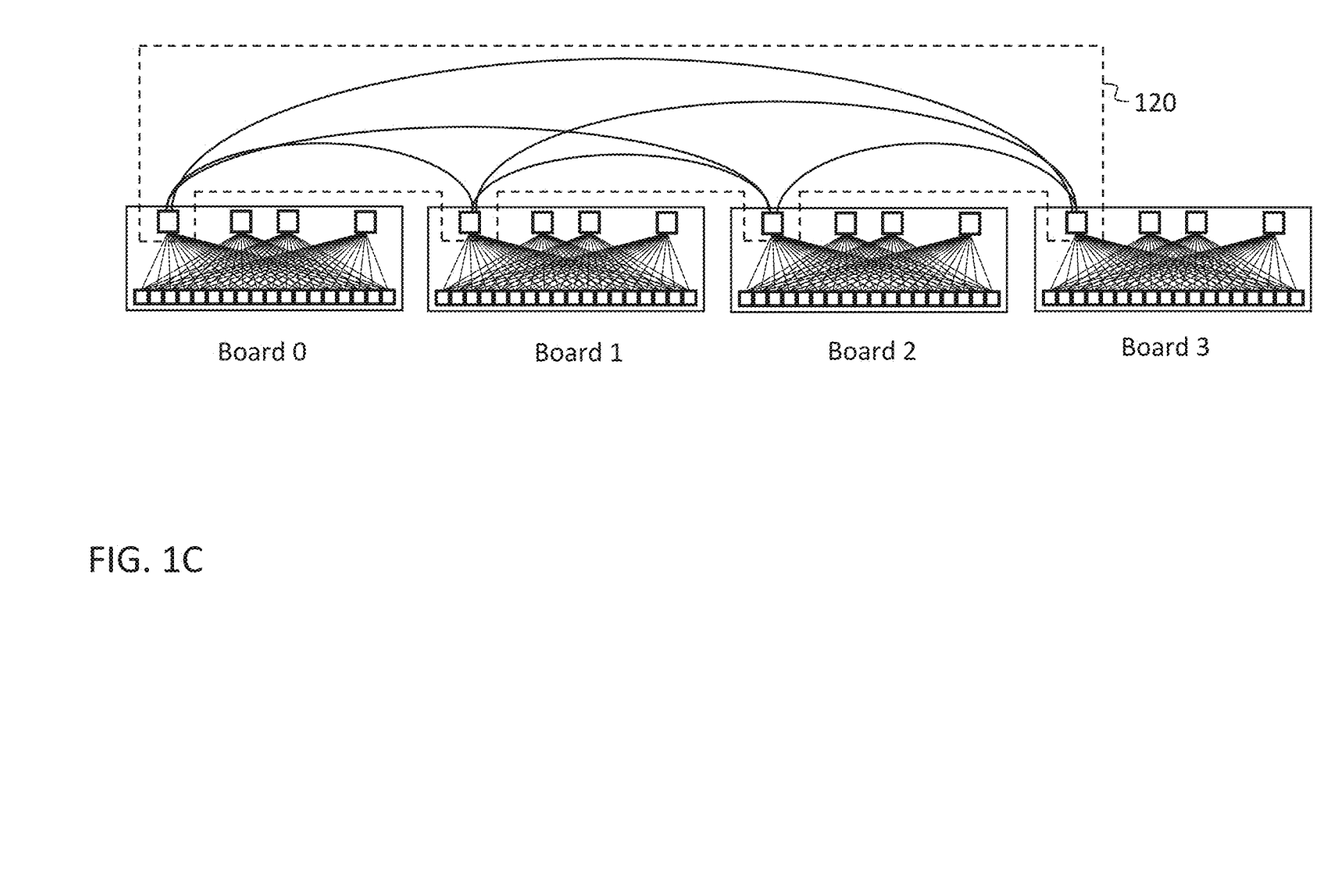
FIG. 1C is a schematic block diagram of a portion of a computing system, according to an embodiment of the present disclosure.

As shown in FIG. 1A, the network may include a plurality of network planes 120 (FIGS. 1C and 1D) each including a switch 115 on each of the compute boards 105 and connections between each of the pairs of switches in the network plane 120. FIG. 1C shows an example of such a network plane 120, which may be referred to herein as the first network plane 120. The network plane 120 illustrated in FIG. 1C includes one switch 115 (the leftmost switch 115) of each of the compute boards 105, and a network connection between each pair of the switches 115 of the network plane 120. Because, on each of the compute boards 105, the switch 115 of the first network plane 120 is connected to all of the compute elements 110 of the compute board 105, the first network plane 120 is sufficient to enable communications, via the first network plane 120, between any of the compute elements 110 on any one of the compute boards 105 and any of the compute elements 110 on any one of the other compute boards 105. The first network plane 120 may similarly enable communications between the compute elements 110 on a compute board 105. For example, a packet transmitted by a first compute element 110 on a compute board 105 may be routed by the switch 115 of the first network plane 120 (or of any of the network planes 120) on the compute board 105 to another compute element 110 on the same compute board 105. Network connections between the switches may be packet-switched connections, e.g., Ethernet connections, or connections using a different packet-switched protocol (e.g., a protocol that is purpose-designed for the computing system), or a circuit-switched protocol.

Figure 1D:
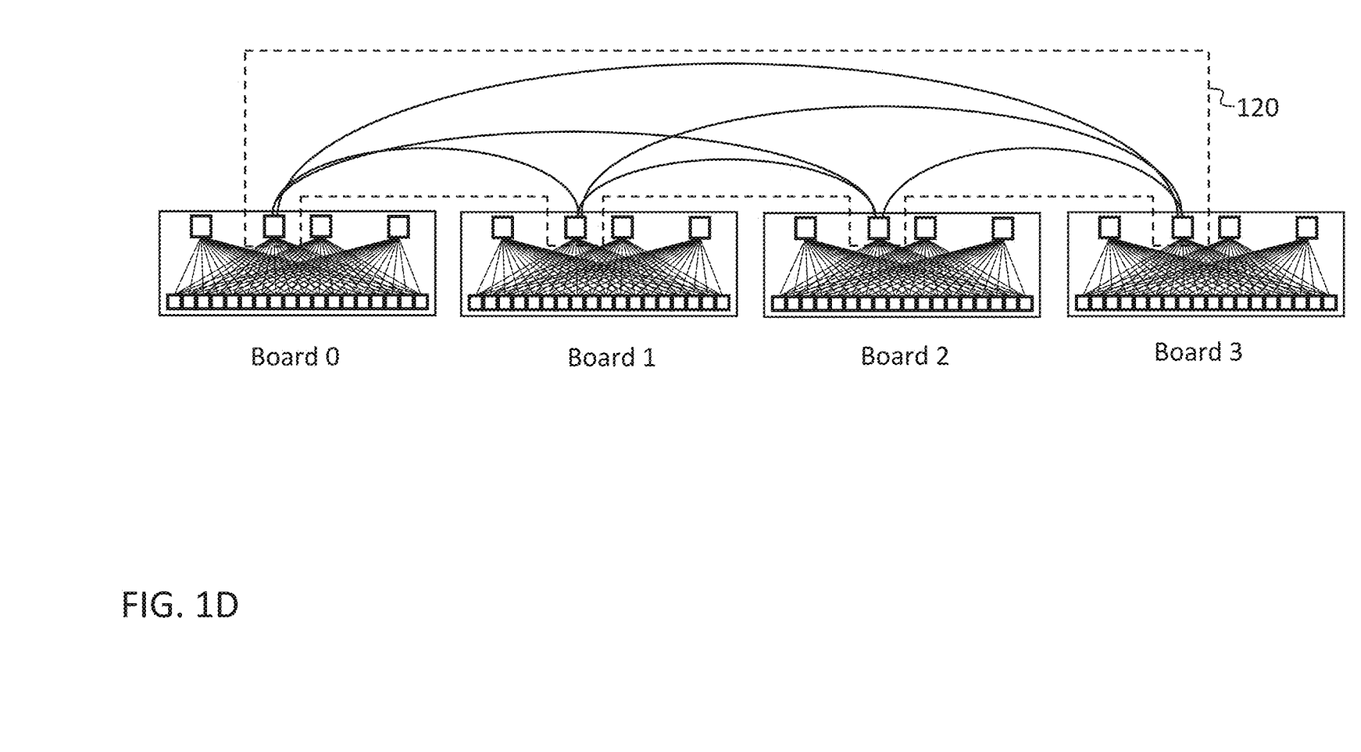
FIG. 1D is a schematic block diagram of a portion of a computing system, according to an embodiment of the present disclosure.

As mentioned above, and as illustrated in FIG. 1A, additional network planes may be present. For example, FIG. 1D shows a second network plane 120, including a second switch 115 of each of the compute boards 105 (the second switch from the left of each of the compute boards 105) and a network connection between each pair of switches 115 of this set of switches 115. Like the first network plane 120, the second network plane 120 has the characteristic that on each of the compute boards 105, the switch 115 of the second network plane 120 is connected to all of the compute elements 110 of the compute board 105. As such, like the first network plane 120, the second network plane 120 is sufficient to enable communications, via the second network plane 120, between any of the compute elements 110 on any one of the compute boards 105 and any of the compute elements 110 on any one of the other compute boards 105. In some embodiments, each of the network planes 120 has the characteristic that any communication, via any of the network planes 120, between any of the compute elements 110 on any one of the compute boards 105 and any of the compute elements 110 on any one of the other compute boards 105 requires at most (e.g., requires exactly) one hop, e.g., any such communication traverses at most (e.g., traverses exactly) two switches 115.

In some embodiments, the boards and the network connections may be sufficiently compact (i) to fit within one rack, e.g., within a volume of less than 2 cubic meters, and (ii) to have a propagation delay of less than 100 ns along each of the network connections. In some such embodiments, the computing system includes a large number (e.g., at least 1000) compute elements 110, e.g., it may include 32 compute boards 105 each including 32 compute elements 110. In some embodiments, the network planes 120 are independent in the sense that there is no data path between any two network planes 120 that does not traverse one of the compute elements 110.

As such, each network plane 120 is a standalone network connecting all of the compute elements 110 in the computing system. Each network plane 120 may be identical to all of the other network planes 120, and any one of the network planes 120 plane may be sufficient to route packets between all compute elements. Each network plane 120 may operate independently of the other planes network planes 120. In some embodiments, one or more of the network planes 120 are dedicated to a particular application. For example, if a first application requires relatively uniform bandwidth or latency in the network connections between the compute boards 105, and if the performance of the first application would be degraded or rendered unacceptable by an occasional increase in latency or an occasional decrease in bandwidth (as might be expected if network contention exists between the first application and a second application (e.g., a second application placing a time-varying burden on the network)) then acceptable performance of the first application may be ensured by allocating a network plane 120 exclusively to the first application (or allocating several network planes 120, e.g., if a single network plane cannot provide sufficient bandwidth).

In some embodiments, one or more network planes 120 are dedicated to traffic having a particular service requirement, e.g., a service requirement specifying low latency (e.g., latency not exceeding a threshold), or a service requirement specifying high bandwidth (e.g., bandwidth no less than a threshold), or a service requirement specifying both. In some embodiments, a first network plane 120 is dedicated to traffic with a relatively tight service requirement for latency (e.g., a relatively low threshold for the maximum acceptable latency) and a relatively loose service requirement for bandwidth (e.g., a relatively low threshold for the minimum acceptable bandwidth) and a second network plane 120 is dedicated to traffic with a relatively loose service requirement for latency (e.g., a relatively high threshold for the maximum acceptable latency) and a relatively tight service requirement for bandwidth (e.g., a relatively high threshold for the minimum acceptable bandwidth).

Such categories of traffic (e.g., traffic associated with a particular application, or traffic associated with a particular service requirement) may be referred to herein as "traffic classes". As such, a traffic class may be the class of traffic associated with an application, or a traffic class may be the class of traffic associated with a service requirement. In some embodiments, a traffic class may include a plurality of types of traffic, e.g., it may include both (i) traffic having a first service requirement and (ii) traffic having a second service requirement, or it may include both (i) traffic associated with a first application and (ii) traffic associated with a second application, or it may include both (i) traffic associated with a first application and (ii) traffic having a certain service requirement, or it may include traffic or three or more different types.

In some embodiments, an application may generate traffic in multiple traffic classes, e.g., it may generate (e.g., for different purposes) both (i) traffic with a relatively tight service requirement for latency and a relatively loose service requirement for bandwidth and (ii) traffic with a relatively loose service requirement for latency and a relatively tight service requirement for bandwidth. Other examples of traffic classes may include a class for bulk data (which may be for large volumes of data that is to be transferred between two compute elements 110, with relatively loose latency requirements), input-output data (for data to be sent to, or received from, an input or output device) and synchronization data (which may have a service requirement for relatively low, and highly predictable, latency (e.g., latency that varies by less than a threshold from a predicted latency)).

In some embodiments, one or more network planes 120 may be dedicated as shared network planes 120 for overflow traffic, e.g., for (i) traffic that does not fall into any of the traffic classes for which dedicated network planes 120 have been assigned, or (ii) traffic, of a traffic class for which one or more dedicated network planes 120 have been assigned, that, if sent in one of these dedicated network planes 120, would burden the network plane 120 sufficiently to prevent a service requirement from being met.

The operation of the computing system may be managed by several software components including a run time system and a fabric manager, each of which may be a distributed application running on all of the compute boards 105 (e.g. on all of the compute elements 110 or on one or more compute elements 110, on each compute board 105, reserved for these software components). In some embodiments, each of (or one of) the run time system and the fabric manager runs on fewer than all of the compute boards 105 but collects data from all of the compute boards 105. The run time system may include a scheduler and may manage the running of applications on the computing system, e.g., it may start applications, and assign one or more network planes 120 or traffic classes to some of the applications it starts. The fabric manager may be a software component that monitors and manages the state of the network planes 120.

In operation, various mechanisms may be employed to monitor the performance of, and load on, each of the network planes 120. For example, each of the switches 115 may include a counter (which may be referred to as a "utilization counter"), associated with each of the ports of the switch, which counts units of transmitted or received data (e.g., transmitted or received packets or transmitted or received bytes). The fabric manager may read the utilization counters and aggregate them per switch 115 (or the switch 115 may perform this aggregation), or per network plane 120, to generate utilization metrics (e.g., to calculate the utilization of the network plane 120). Each switch 115 may also include transmit and receive buffers (e.g., for each port) each buffer being configured as a first in first out (FIFO), or "queue", with registers pointing to the beginning and end of each queue. The fabric manager (or the switch 115) may, from the values of these registers (or "pointers"), generate a measure of latency for each port, and an aggregated measure of latency for the switch 115 or for the network plane 120.

When an application transmits a message for forwarding to another compute element 110 the message may indicate (e.g., using the values of a corresponding set of bits in the message) which network planes 120 may be used to send the message, or what traffic class or traffic classes the message falls into, or what the service requirement is for the message. The fabric manager may then send the message to a switch 115 meeting any constraints (e.g., constraints on which network planes 120 may be used) specified in the message. If several switches 115 meet the constraints, the fabric manager may select a switch 115 with the lowest estimated latency or the lowest utilization, or a switch 115 selected based on some other such performance-related measure.

In a computing system such as those of embodiments described herein, power consumption may be a significant design constraint and may significantly affect operating cost, or performance, or both. As the number of compute elements per compute board 105 is increased, the number of network components (e.g., switches 115) employed to connect them together may also grow, and the power consumption of the network components may be significant. The greater the power that is used for such network components, the less power is available for compute elements 110.

As such, in some embodiments, mechanisms for network power reduction are employed. For example, in an embodiment such as that of FIG. 1A or FIG. 2, the path diversity provided by the network planes 120 may allow an entire network plane 120 to be deactivated (e.g., powered down) without affecting the connectivity between the compute elements 110 in the computing system. In some embodiments including N network planes 120 it may be possible to power down N−1 of the network planes 120 (reducing the power consumption of the network by a factor of approximately N) without affecting the connectivity between the compute elements 110 in the computing system. Powering down a network plane 120 may involve powering down all components (e.g., switches 115 and links) in the network plane 120. As used herein "powering down" or "deactivating" a component means causing the component to transition to a low-power state, or mode of operation, or shutting off power to the component entirely.

In some embodiments, the computing system (e.g., the run time system or the fabric manager of the computing system) collects (i) usage information across the switches 115 or (ii) bandwidth demand (e.g., predicted bandwidth demand) for applications currently running on the computing system, and uses this information to determine whether to power down one or more of the network planes 120 (or whether to power any previously powered-down network planes 120 back up). For example the computing system may have one or more criteria for deactivating a network plane 120. The criteria may include, for example, whether a utilization of the network plane 120 is less than a threshold, or whether an expected utilization of the network plane 120 is less than a threshold. The utilization of the network plane 120 may be calculated based on the value of one or more utilization counters.

The expected utilization may be calculated based on forecasts made by applications running on the computing system. For example, an application may, upon transition to a different phase of execution, or upon calling a function for sending a plurality of messages to other compute elements 110, generate an indication of expected network plane use (e.g., by calling a system function with such an estimate of expected network plane use as an argument), and the computing system may then calculate the expected utilization of a network plane based on such indications of expected network plane use, produced by the application and possibly by other applications.

As such, the utilization of a network plane 120 may be defined to be (i) the recent or present utilization of the network plane 120 (e.g., as measured by utilization counters), or (ii) the expected utilization of the network plane 120, or (iii) a measure of utilization that takes into account both the present utilization, and the expected utilization, and possibly other factors (e.g., a historical utilization recorded in system logs). The total utilization of a plurality of network planes 120 (e.g., of all of the network planes 120 in the system) may be defined and calculated in an analogous manner.

For example, in some embodiments, the computing system may, during operation, determine that a criterion for deactivating a network plane 120 is met, and deactivate the network plane 120. The criterion may be based, for example, on the utilization of the network plane 120, or on the utilization of a plurality of network planes 120 (e.g., of all of the network planes 120 in the system). For example if the utilization is less than the bandwidth of all the network planes 120, only enough network planes 120 to meet slightly more than the utilization may be enabled (and the other network planes 120 may be deactivated). The deactivating may include causing the network plane 120 to transition to a low-power state, or shutting off the network plane 120. When the computing system makes a decision to power down a network plane 120, it may cause the compute elements 110 to cease sending traffic to the network plane 120, before deactivating the first network plane. It may also wait for traffic to drain out of network plane 120 (e.g., it may wait for the buffers in the switches 115 of the network plane 120 to be empty), before deactivating the network plane 120. When any network plane 120 has been deactivated, the computing system may route packets, that otherwise might have been routed via that network plane 120, via a different network plane 120.

Figure 3:
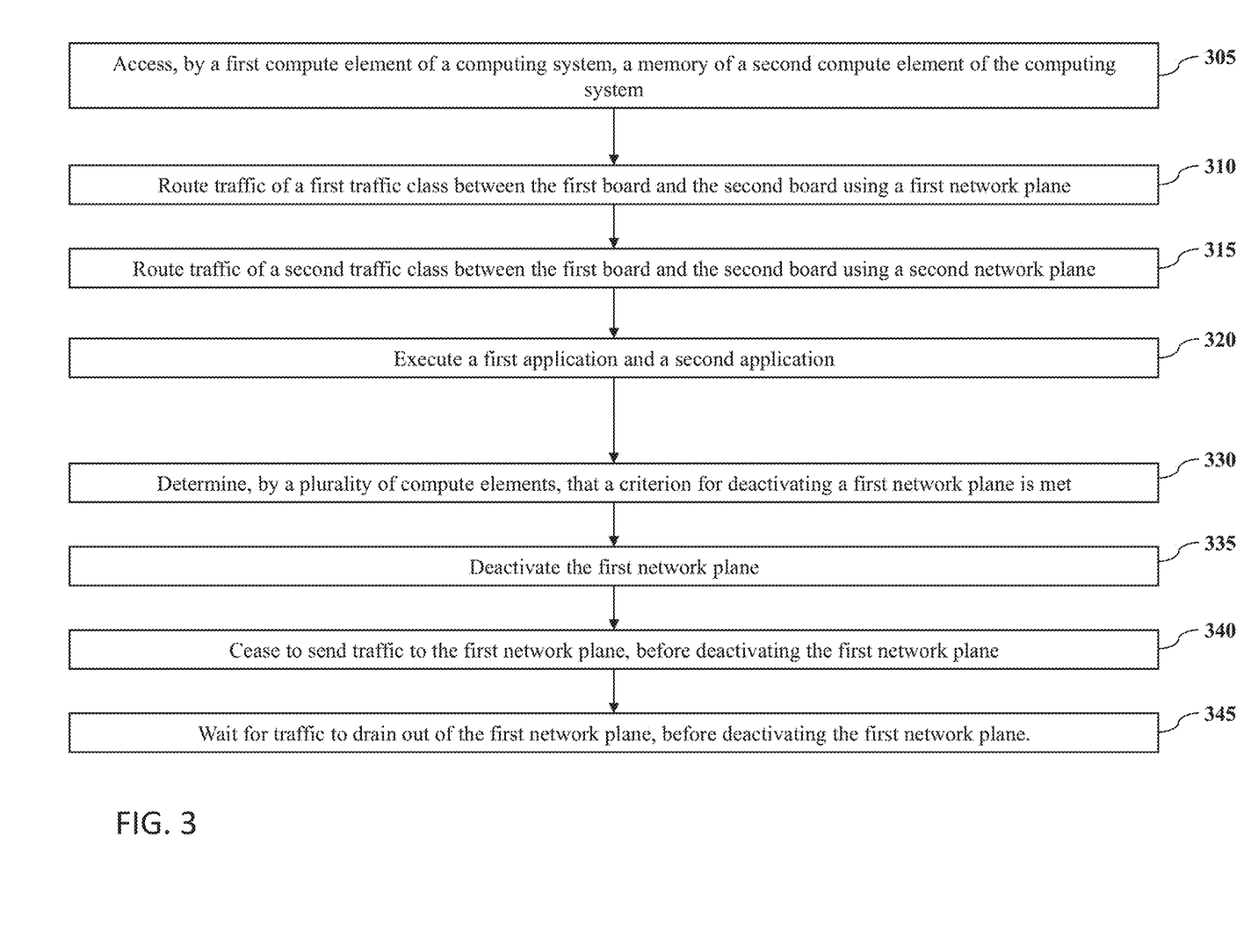
FIG. 3 is a flow chart of a method, according to an embodiment of the present disclosure.

FIG. 3 is a flow chart of a method, in some embodiments. The method includes accessing, at 305, by a first compute element of a computing system, a memory of a second compute element of the computing system. The computing system may include a first board and a second board. The first board may include a first switch, a second switch, a memory, and the first compute element. The second board may include a first switch, a second switch, a memory, and the second compute element. The accessing may include executing a load instruction or a store instruction.

The computing system may include a plurality of compute elements including the first compute element and the second compute element, and a plurality of memories including the memory of the first board and the memory of the second board. The plurality of memories may store instructions that, when executed by the plurality of compute elements, cause the plurality of compute elements: to route, at 310, traffic of a first traffic class between the first board and the second board using the first network plane; and to route, at 315, traffic of a second traffic class between the first board and the second board using the second network plane. The method may further include executing, at 320, a first application and a second application, wherein the first traffic class includes traffic generated by the first application, and the second traffic class includes traffic generated by the second application.

The method may further include determining, at 330, by a plurality of compute elements, that a criterion for deactivating a first network plane is met; and deactivating, at 335, the first network plane. The compute elements may be part of a computing system including a first compute board, a second compute board, the plurality of compute elements, a plurality of memories, the first network plane, and a second network plane connecting the first compute board and the second compute board. The first network plane may connect the first compute board and the second compute board. The method may further include ceasing, at 340, to send traffic to the first network plane, before deactivating the first network plane. The method may further include waiting, at 345, for traffic to drain out of the first network plane, before deactivating the first network plane.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X−Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Although exemplary embodiments of a multi-node computing system have been specifically described and illustrated herein, many modifications and variations will be apparent to those skilled in the art. Accordingly, it is to be understood that a multi-node computing system constructed according to principles of this disclosure may be embodied other than as specifically described herein. The invention is also defined in the following claims, and equivalents thereof.

What is claimed is:

1. A system, comprising:
a first compute board;
a second compute board;
a plurality of compute elements;
a plurality of memories;
a first network plane connecting the first compute board and the second compute board; and
a second network plane connecting the first compute board and the second compute board,
the plurality of memories storing instructions that, when executed by the plurality of compute elements, cause the plurality of compute elements to:
determine that a criterion for deactivating the first network plane is met; and
deactivate the first network plane.

2. The system of claim 1, wherein the deactivating of the first network plane comprises causing the first network plane to transition to a low-power state.

3. The system of claim 1, wherein the instructions, when executed by the plurality of compute elements, further cause the plurality of compute elements to cease sending traffic to the first network plane, before deactivating the first network plane.

4. The system of claim 1, wherein the instructions, when executed by the plurality of compute elements, further cause the plurality of compute elements to wait for traffic to drain out of the first network plane, before deactivating the first network plane.

5. The system of claim 1, wherein the determining that the criterion for deactivating a network plane is met comprises:
calculating a utilization of the first network plane; and
determining that the utilization of the first network plane is less than a threshold.

6. The system of claim 5, wherein:
a switch of the first network plane comprises a first utilization counter, and
calculating the utilization of the first network plane comprises calculating the utilization of the first network plane based on a value of the first utilization counter.

7. The system of claim 6, wherein calculating the utilization of the first network plane comprises calculating the utilization of the first network plane based on a plurality of respective values of a plurality of utilization counters including the value of the first utilization counter.

8. The system of claim 1, wherein the determining that the criterion for deactivating a network plane is met comprises:
calculating an expected utilization of the first network plane; and
determining that the expected utilization of the first network plane is less than a threshold.

9. The system of claim 8, wherein:
the instructions, when executed by the plurality of compute elements, further cause the plurality of compute elements to execute an application;
the executing of the application comprises generating an indication of expected network plane use; and
the calculating of the expected utilization of the first network plane comprises calculating the expected utilization of the first network plane based on the indication of expected network plane use.

10. The system of claim 1, wherein the instructions, when executed by the plurality of compute elements, further cause the plurality of compute elements to:
determine that the first network plane is deactivated; and
in response to determining that the first network plane is deactivated, route a packet via the second network plane.

11. The system of claim 1, wherein:
the first compute board comprises:
a first switch;
a second switch;
a memory; and
a compute element,
the second compute board comprises:
a first switch;
a second switch;
a memory; and
a compute element,
the first network plane comprises the first switch of the first compute board and the first switch of the second compute board; and
the second network plane comprises the second switch of the first compute board and the second switch of the second compute board,
the plurality of compute elements includes the compute element of the first compute board and the compute element of the second compute board; and
the plurality of memories includes the memory of the first compute board and the memory of the second compute board.

12. A method, comprising:
determining, by a plurality of compute elements, that a criterion for deactivating a first network plane is met; and
deactivating the first network plane,
wherein the compute elements are part of a computing system comprising:
a first compute board;
a second compute board;
the plurality of compute elements;
a plurality of memories;
the first network plane; and a second network plane connecting the first compute board and the second compute board, and
wherein the first network plane connects the first compute board and the second compute board.

13. The method of claim 12, wherein the deactivating of the first network plane comprises causing the first network plane to transition to a low-power state.

14. The method of claim 12, further comprising ceasing to send traffic to the first network plane, before deactivating the first network plane.

15. The method of claim 12, further comprising waiting for traffic to drain out of the first network plane, before deactivating the first network plane.

16. The method of claim 12, wherein the determining that the criterion for deactivating a network plane is met comprises:
    calculating a utilization of a plurality of network planes, the plurality of network planes including the first network plane and the second network plane; and
    determining that the utilization of the plurality of network planes is less than a threshold.

17. The method of claim 16, wherein:
    a switch of the first network plane comprises a first utilization counter, and
    calculating the utilization of the first network plane comprises calculating the utilization of the first network plane based on a value of the first utilization counter.

18. The method of claim 17, wherein calculating the utilization of the first network plane comprises calculating the utilization of the first network plane based on a plurality of respective values of a plurality of utilization counters including the value of the first utilization counter.

19. The method of claim 12, wherein the determining that the criterion for deactivating a network plane is met comprises:
    calculating an expected utilization of the first network plane; and
    determining that the expected utilization of the first network plane is less than a threshold.

20. A system, comprising:
    a first compute board;
    a second compute board;
    a plurality of means for processing;
    a plurality of memories;
    a first network plane connecting the first compute board and the second compute board; and
    a second network plane connecting the first compute board and the second compute board,
    the plurality of memories storing instructions that, when executed by the plurality of means for processing, cause the plurality of means for processing to:
        determine that a criterion for deactivating the first network plane is met; and
        deactivate the first network plane.

* * * * *